July 14, 1936.  C. W. CRUMRINE  2,047,257
SELF ERECTING FRONT CAMERA
Filed April 30, 1935
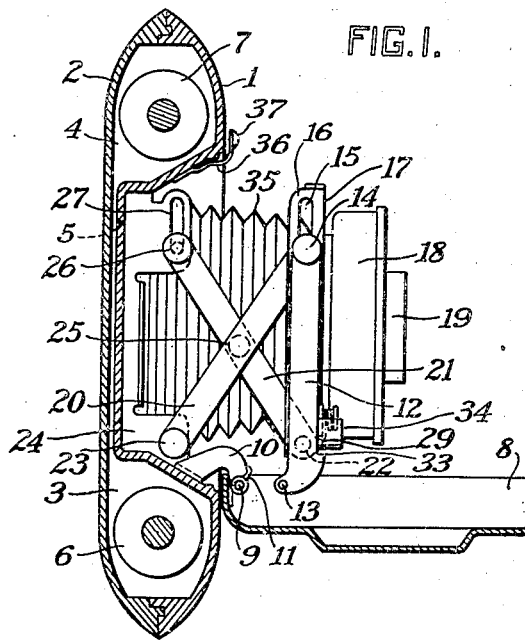
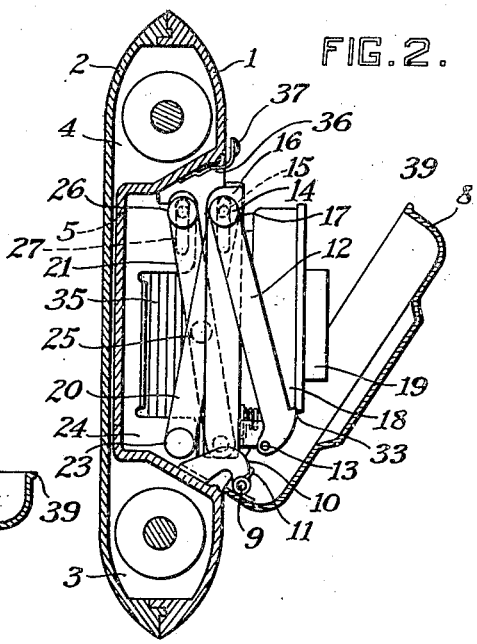
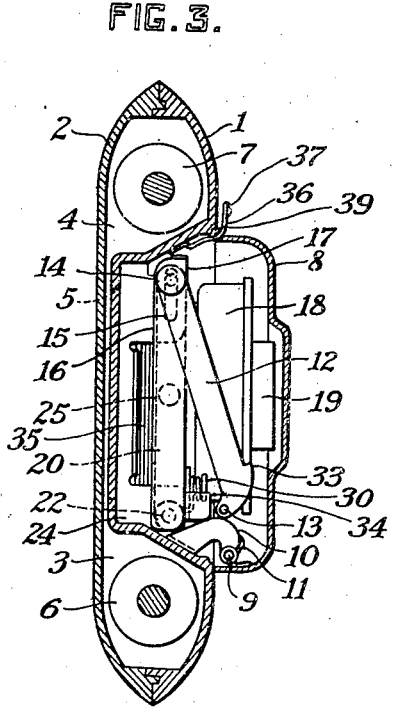
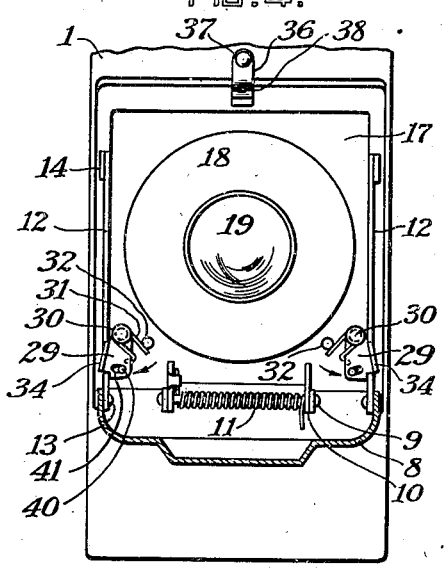
INVENTOR.
Chester W. Crumrine
BY
ATTORNEYS Patented July 14, 1936

2,047,257

UNITED STATES PATENT OFFICE 2,047,257

SELF-ERECTING FRONT CAMERA

Chester W. Crumrine, Rochester, N. Y., assignor to Eastman Kodak Company, Rochester, N. Y., a corporation of New York Application April 30, 1935, Serial No. 19,012

11 Claims. (Cl. 95—32)

This invention relates to photography and more particularly to cameras in which the camera parts are positioned in an open or picture-taking position automatically.

One object of my invention is to provide a simple type of camera construction in which the front automatically moves into a picture-taking position in which it is automatically latched. Another object of my invention is to provide a camera with a self-erecting front, of the type in which the front always moves parallel to the camera body, and to provide a hinged bed which cooperates with the front erecting structure. Another object of my invention is to provide a camera with a front which will be automatically projected into a picture-taking position and a bed which cooperates with the front erecting mechanism by which it is solely supported. Another object of my invention is to provide a simple type of latch mechanism which will hold the parts in an open or picture-taking position, and other objects will appear from the following specification, the novel features being particularly pointed out in the claims at the end thereof.

In self-erecting front cameras, particularly of the more compact type, the space inside of the camera body is quite limited, and consequently, the mechanism which goes into this space must also be compact. With the new small-sized cameras, it is preferable to provide a camera objective of relatively large aperture, this requiring a large shutter and still further reducing the space into which the erecting mechanism must go.

Since self-erecting front mechanisms always depend on some form of spring action, it is desirable to provide a self-erecting front mechanism which can be operated either totally by the spring pressure or partially by a manual force applied to a part of the camera in the opening movement. It is also desirable to operate such cameras entirely manually in case the erecting spring should become weakened or broken.

My improved form of self-erecting front mechanism is particularly directed to cameras of the small type in which the front is normally projected by a spring into picture-taking position, but in which the front may be projected manually should the spring become damaged.

Coming now to the drawing wherein like reference characters denote like parts throughout:

Fig. 1 is a part side elevation and part section of a self-erecting front camera constructed in accordance with and embodying a preferred form of my invention.

Fig. 2 is a view similar to Fig. 1 but with the parts in a partially closed position.

Fig. 3 is a similar view to Fig. 2, but with the parts in a totally closed position.

Fig. 4 is a front elevation partially in section of the camera shown in Fig. 1.

In accordance with a preferred embodiment of my invention, the camera body may be of a compact type. This camera body 1 is adapted to receive a back 2 which covers the spool chambers 3 and 4. These chambers, as is customary, lie to each side of an exposure frame 5 across which the film is drawn from the supply spool chamber 3 to the take-up spool chamber 4 for exposing successive areas of film. The supply spool 6 and the take-up spool 7 may be used to wind the film across the exposure area in the usual manner.

On the front of the camera body 1, I provide a hinged bed 8, this bed being carried by a hinge pintle 9 which in turn is carried by a hinge having extended arms 10 so that the hinge pintle 9 will lie outside of the normal contour of the camera body. Surrounding the hinge pintle 9 is a coiled spring 11, best shown in Fig. 4, the tendency of this spring being to thrust the bed from the position shown in Fig. 3 to the position shown in Fig. 1—that is, to thrust the bed into a position in which the camera is in an open or picture-taking position.

It might be noted here that the camera bed 8 is not provided with the usual bed braces connecting it to the camera, but it is supported in accordance with the preferred form of my invention by means of a pair of similar links 12 arranged on each side of the camera bed. Each link 12 is pivoted at 13 to the camera bed and is pivotally attached to a stud 14. This stud is mounted to slide in the slot 15 carried by the flange 16 which forms a part of the lens board 17.

As is customary, the lens board 17 may carry a shutter 18 and the camera objective, one element of which is mounted in the lens cell 19.

Since the lazy tongs on each side of the camera are the same, only one will be described, and the reference characters will be the same in each case. The lazy tongs for supporting the lens board 17 comprise a pair of arms 20 and 21, the lower ends of which are pivoted at 22 and 23 to the lens board 17 and to a bracket in the camera body 24. The arms 20 and 21 are pivoted together at 25 and one arm is attached to the stud 14 at its upper end, the other arm being attached to a similar stud 26 which is mounted to slide in the slot 27, also carried by the bracket 24. Thus, when the lens board 17 moves to and from the camera body, it will always be held in parallel relation thereto, and the lazy tongs may move upon their pivots as the studs 14 and 26 slide in their respective slots.

Since the lazy tongs always move the lens board 17 parallel with the camera body 1, and since the bed 8 swings upon its hinge pintle 9 simultaneously with movement of the lazy tongs, the distance the pin 14 moves in the slot 15 in the connection between the lens board 17 and the lazy tongs determines the spacing of the link pivot 13 attaching it to the bed 8 from the bed hinge pintle 9. This distance should be approximately the same as the length of slot 15.

The sliding movement of the arms constituting the lazy tongs slide the stud 14 in the slot 15 and likewise moves the link 12 when the camera is in an open or a picture-taking position, as shown in Fig. 1. The camera bed is at right angles to the camera body and is held in this position by means of a spring latch, best shown in Fig. 4. As here shown, the latch elements are identical and each consist of a member 29 pivoted at 30 to the lens board 17. A spring 31 encircles the pivot, and by engaging a pin 32 and a portion of the latch, tends to thrust the latch elements, in the direction shown by the arrows, away from each other. Thus, when the camera bed 8 is moved downwardly under the impulse of the spring 11 and the camera front 1 is projected outwardly, hooks 33 on the lower ends of the links 12 become engaged by the latch members 29, and since these prevent a sliding movement of the stud 14 in the slot 15, the camera will be locked in an open or picture-taking position.

In order to release this lock, the finger pieces 34 of the latch members are merely pressed together, releasing the hooks 33 so that by turning the bed in the direction shown by the arrow in Fig. 2, the stud 14 is forced upwardly through its slot 15, thus causing the lazy tongs to swing upon their pivotal mounts and causing the camera to fold in the position shown in Fig. 3. In this position it will be seen that the camera bed 8 completely covers the shutter 18 and the objective partially held by the lens cell 19 so that no dust can enter and mar the lens.

It is, of course, necessary to connect the lens board 17 and the camera body by means of the bellows of the usual type shown at 35. A latch consisting of a spring arm 36 with a finger release 37 is provided on the camera body, this latch being provided with an opening 38 in which a projection 39 in the camera body may engage to hold the camera in a closed position with the bed folded tightly against the camera body.

Movement of the latch elements 29 as shown by Fig. 4 upon their pivots 30 may be controlled by providing pins 40 on the lens board extending upwardly through slots 41 in the latch elements. Thus, in Fig. 4, the latch elements are shown in their operative positions, which are the positions they assume under the impulse of their springs 31 when they are in a latching position. By pressing inwardly upon the finger grips 29, these latch elements may move the limited distance permitted by the pins 40 and the slots 41. This also prevents the latch elements from interfering with the lazy tongs or the links 12 when the camera is made to fold.

The operation of a camera constructed in accordance with my invention is very simple. With the camera in the position shown in Fig. 3, in order to position the parts for taking pictures, it is only necessary to press inwardly upon the finger-piece 37, releasing the latch elements 38 and 39. As soon as this is done, the spring 11 causes the front to be projected outwardly, and as the camera bed moves down about its hinge pintle 9 under the impulse of this spring, the link 12, which is pivoted to the bed at 13 and which is swung upon the stud 14, pulls the stud 14 downwardly in its slot 15 so that as soon as the bed reaches the position shown in Fig. 1, the camera parts are in an erect or picture-taking position. When they reach this position, the latch elements 29 snap over the hooks 33, thus holding the parts rigidly in their operative position.

This opening movement normally takes place under the force applied by the spring 11. However, if this spring should become weak or if it should be accidentally broken, it would still be possible to operate this camera very quickly and easily. In such a case, the camera bed 8 could be manually swung upon its hinge 9 and the camera parts would move outwardly in exactly the same manner as before.

In order to close the camera, the finger grips 29 are merely pressed together and the bed turned upon its hinge pintle 13. This causes the lazy tongs to collapse and draws the projected camera parts back into the camera body.

While it is obvious that various changes can be made in the construction of the self-erecting front mechanism, I consider as within the scope of my invention all such changes in construction as may come within the scope of the appended claims.

What I claim is:

1. In a self-erecting front camera, the combination with a camera body, of a front carrying an objective, lazy tongs comprising a plurality of members each pivotally mounted at one end and slidably mounted at the other end on the camera body and front, said lazy tongs constituting means on which the front may move relatively to the body and in parallel relation thereto, a camera bed hingedly mounted on the camera body, a link connected to a lazy tongs member at the slidably mounted end and connected to the bed for forming the sole support for the bed, said link being adapted to swing through a relatively small angle in moving the camera front relative to the camera body.

2. In a self erecting front camera, the combination with a camera body, of a front carrying an objective, lazy tongs on which the front may move relatively to the body and in parallel relation thereto, a camera bed hingedly mounted on the camera, a link connected to the lazy tongs and bed for forming the sole support for the bed, and a latch element cooperating with the link for holding the parts in an open or picture taking position.

3. In a self erecting front camera, the combination with a camera body, of a front carrying an objective, lazy tongs on which the front may move relatively to the body and in parallel relation thereto, a camera bed hingedly mounted on the camera, a link connected to the lazy tongs and bed for forming the sole support for the bed, and a spring latch movably mounted with respect to the link and adapted, through engagement with the link, to lock the camera in an open or picture taking position.

4. In a self erecting front camera, the combination with a camera body, of a front carrying an objective, lazy tongs on which the front may move relatively to the body and in parallel relation thereto, a camera bed hingedly mounted on the camera, a link connected to the lazy tongs and bed for forming the sole support for the bed, a spring latch mounted on the lens board and projecting into the path of the link for engaging it and locking the camera in an open or picture taking position.

5. In a self erecting front camera, the combination with a camera body, of a front carrying an objective, lazy tongs on which the front may move relatively to the body and in parallel relation thereto, a camera bed hingedly mounted on the camera, and a link swingingly connected to a lazy tongs pivot and pivotally connected to the bed whereby movement is transmitted from one part to the other in opening and closing the camera and means for preventing movement of the link whereby the camera may be locked in an open or picture taking position.

6. In a self erecting front camera, the combination with a camera body, of a front carrying an objective, pairs of pivoted lazy tongs supporting each side of a lens board carrying an objective on which the lens board may move always in parallel relation to the camera body, links pivotally mounted on the pivoted lazy tongs, a bed hinged to the camera and to the links, and a pair of latch members movably mounted to each side of the camera objective to engage the two links locking the camera in an open or picture taking position.

7. In a self erecting front camera, the combination with a camera body, of a front carrying an objective, pairs of pivoted lazy tongs supporting each side of a lens board carrying an objective on which the lens board may move always in parallel relation to the camera body, links pivotally mounted on the pivoted lazy tongs, a bed hinged to the camera and to the links, and a pair of latch members movably mounted to each side of the camera objective to engage the two links locking the camera in an open or picture taking position, said latch members being releasable by pressing them toward each other.

8. In a self erecting front camera the combination with a camera body, of a bed hingedly attached thereto, a lazy tongs carried by the camera body, a lens board carrying an objective and likewise mounted on the lazy tongs, the lazy tongs comprising a pair of pivotally mounted cross arms pivotally attached at one end to the camera body and lens board and having a pin and slot connection with the camera body and lens board at their opposite ends, and a member connecting a pin of the pin and slot connection of a lazy tongs arm and the bed, comprising a link pivotally attached to the bed, and a latch adapted to prevent the pin from sliding in the slot for locking the parts in a picture taking position.

9. In a self erecting front camera the combination with a camera body, of a bed hingedly attached thereto, a spring carried by the hinge pintle tending to open the camera bed, a lazy tongs carried by the camera body, a lens board carrying an objective and likewise mounted on the lazy tongs, the lazy tongs comprising a pair of pivotally mounted cross arms pivotally attached at one end to the camera body and lens board and having a pin and slot connection with the camera body and lens board at their opposite ends, and a member connecting a pin of the pin and slot connection of a lazy tongs arm and the bed, comprising a link pivotally attached to the bed, whereby movement of the bed under the impulse of the spring is transmitted to the lazy tongs, and a latch adapted to prevent the pin from sliding in the slot for locking the parts in a picture taking position.

10. In a self-erecting front camera, the combination with a camera body, of a front carrying an objective, lazy tongs on which the front may move relatively to the body and in parallel relation thereto and comprising a plurality of members pivoted together, a camera bed hingedly mounted on the camera, said bed hinge being positioned outside of the camera body, and a link pivoted to lazy tongs members above their pivotal connections and connecting the lazy tongs and bed, and being pivoted to the latter near the bed hinge, whereby said link may move through a slight angle about its pivot when the camera bed is moved relative to the camera body.

11. In a self erecting front camera, the combination with a camera body, of a front carrying an objective, lazy tongs on which the front may move relatively to the body and in parallel relation thereto, a support for the lazy tongs including a slot, a stud slidable in the slot carrying a part of the lazy tongs, a bed pivoted to the camera body outside of the camera body, a connecting member attached to the slidable stud and pivotally attached to the bed, said pivotal connection being spaced from the bed hinge a distance approximately the same as the length of movement of the slot in the support whereby the camera bed may swing upon its hinge simultaneously with movement of the lazy tongs.

CHESTER W. CRUMRINE.